United States Patent
Johnston et al.

(10) Patent No.: US 6,899,910 B2
(45) Date of Patent: May 31, 2005

(54) PROCESSES FOR RECOVERY OF CORN GERM AND OPTIONALLY CORN COARSE FIBER (PERICARP)

(75) Inventors: David B. Johnston, Wyndmoor, PA (US); Vijay Singh, Savoy, IL (US)

(73) Assignees: The United States of America as represented by the Secretary of Agriculture, Washington, DC (US); The Board of Trustees of the University of Illinois, Urbana, IL (US)

( * ) Notice: Subject to any disclaimer, the term of this patent is extended or adjusted under 35 U.S.C. 154(b) by 41 days.

(21) Appl. No.: 10/863,682

(22) Filed: Jun. 8, 2004

(65) Prior Publication Data

US 2005/0009133 A1 Jan. 13, 2005

Related U.S. Application Data

(60) Provisional application No. 60/478,042, filed on Jun. 12, 2003.

(51) Int. Cl.[7] ............................ A23L 1/105; A23L 1/172
(52) U.S. Cl. .......................................... 426/482; 426/52
(58) Field of Search ............................ 426/482, 49, 52, 426/481; 241/6, 8, 9

(56) References Cited

U.S. PATENT DOCUMENTS

| | | | | | |
|---|---|---|---|---|---|
| 3,615,655 | A | * | 10/1971 | Freeman et al. | ................ 241/9 |
| 4,181,747 | A | * | 1/1980 | Kickle et al. | ................ 426/615 |
| 5,073,201 | A | * | 12/1991 | Giesfeldt et al. | ............. 127/67 |
| 6,254,914 | B1 | * | 7/2001 | Singh et al. | ................ 426/482 |
| 6,592,921 | B2 | * | 7/2003 | Taylor et al. | ................ 426/312 |

* cited by examiner

*Primary Examiner*—Keith Hendricks
(74) *Attorney, Agent, or Firm*—John D. Fado; G. Byron Stover

(57) ABSTRACT

A process for recovering corn germ and corn coarse fiber from corn in a dry grind process, involving soaking corn kernels in water to produce soaked corn kernels, grinding the soaked corn kernels to produce a ground corn slurry, and incubating the ground corn slurry with at least one enzyme (amylase(s), protease(s), cell wall degrading enzyme(s), or mixtures thereof, and optionally other enzyme(s)) to increase the specific gravity of the slurry to about 10-about 16 Baume so that the corn germ and corn coarse fiber floats to the top of the slurry, recovering the corn germ and the corn coarse fiber, and optionally producing ethanol from the slurry no longer containing the corn germ and corn coarse fiber. The process does not involve the addition of starch, a salt, a sugar syrup, or mixtures thereof to the slurry.

38 Claims, 7 Drawing Sheets

PROCESSES FOR RECOVERY OF CORN GERM AND OPTIONALLY CORN COARSE FIBER (PERICARP)

REFERENCE TO RELATED APPLICATION

This application claims the benefit of U.S. Provisional Application No. 60/478,042, filed 12 Jun. 2003, which is incorporated herein by reference in its entirety.

BACKGROUND OF THE INVENTION

The present invention relates generally to the recovery of corn germ and optionally corn coarse fiber (pericarp) from corn, and more particularly to processes for the recovery of corn germ and optionally corn coarse fiber by flotation (e.g., through the use of enzymes such as amylases, proteases, cell wall degrading enzymes, or mixtures thereof).

Corn coarse fiber (also known as pericarp or pericarp fiber or bran) is the outer covering of a kernel of corn, and is a product that can be used as feedstock for the production of such end products as Corn Fiber Gum (CFG) and Corn Fiber Oil. Corn Fiber Gum can be used in both food and non-food applications as a film former, an emulsifier, a low-viscosity bulking agent, an adhesive, or as a substitute for gum Arabic. Corn Fiber Oil has three natural phytosterol compounds (ferulate phytosterol esters or "FPE," free phytosterols or "St," and phytosterol fatty acyl esters or "St:E") that have been found to lower serum cholesterol in blood, and therefore can be used as a nutraceutical product. Such products command high dollar values in the market (approximately $8.00 to $9.00 per pound).

One of the many end-products in which corn is used as the base-product is ethanol. Currently, ethanol is being produced from corn mainly via two different processes: a wet mill process and a dry-grind process (which is not to be confused with a dry-milling process).

In wet milling, corn is separated into its different components (germ, fiber, protein, and starch) using various separation techniques. The clean starch is then cooked, saccharified, fermented, and distilled to make ethanol. Wet milling is a very capital intensive process, but these costs are offset by the resulting high value co-products of the process (such as corn oil produced from the germ, gluten meal from the protein, and gluten feed from the fiber and solubles).

In the other primary process for producing ethanol, the dry-grind process, raw corn is ground, mixed with water, cooked, saccharified, fermented, and then distilled to make ethanol. However, while the only fermentable product in corn is the starch, the other non-fermentable components of the corn (e.g., the germ, the fiber, and the protein) are carried through the remainder of the dry-grind processing steps, and are recovered at the end as distillers dried grains with solubles (DDGS). In current dry-grind processes, neither the germ nor the pericarp are recovered separately, but instead these components end up as part of the DDGS.

The dry-grind process is not a very capital intensive process (when compared with the wet-mill process), but the primary co-product produced (DDGS, which is a livestock feed product) is a relatively low value product. Accordingly, because of the low value co-product, the net corn cost is higher in dry-grind ethanol plants that it is in wet-mill plants. Thus, when corn prices increase, it is very difficult to economically justify operating dry-grind ethanol plants that can only produce low value co-products with the ethanol.

One strategy for reducing the net corn cost in dry-grind ethanol plants is to recover co-products other than DDGS, especially non-fermentable co-products. Previously, modifications to conventional dry-grind ethanol plants that enabled the recovery of the germ were studied. This modified dry grind ethanol process is known as the "Quick Germ" process described in U.S. Pat. No. 6,254,914, and involves soaking whole kernel corn in water before degermination. The germ is then recovered by flotation (which involves the addition of corn starch, thin stillage, a salt such as sodium nitrate, and/or sugar syrup such as high fructose corn syrup or dextrose) and the use of germ hydrocyclones, and the remainder of the corn is ground and processed for ethanol production. Economic analysis has shown that the "Quick germ" process has the potential to reduce the cost of ethanol production by between 0.33 to 2.69 cents/liter. Although such cost reductions (primarily realized through the sale of the germ) have been helpful, further cost reductions are still necessary for dry-grind ethanol plants to remain competitive.

SUMMARY OF THE INVENTION

In accordance with the present invention there is provided a process for recovering corn germ and corn coarse fiber from corn in a dry grind process, involving soaking corn kernels in water to produce soaked corn kernels, grinding the soaked corn kernels to produce a ground corn slurry, and incubating the ground corn slurry with at least one enzyme (amylase, protease, cell wall degrading enzyme, or mixtures thereof) to increase the specific gravity of the slurry to about 10-about 16 Baume so that the corn germ and corn coarse fiber floats to the top of the slurry, recovering the corn germ and the corn coarse fiber, and optionally producing ethanol from the slurry no longer containing the corn germ and corn coarse fiber. The process does not involve the addition of starch, a salt, a sugar syrup, or mixtures thereof to the slurry.

Also in accordance with the present invention there is provided a process for recovering corn germ and corn coarse fiber from corn in a dry grind process, involving soaking corn kernels in water to produce soaked corn kernels, grinding the soaked corn kernels to produce a ground corn slurry, incubating the ground corn slurry with at least one enzyme (amylase, protease, cell wall degrading enzyme, or mixtures thereof) to increase the specific gravity of the slurry to about 7-about 11 Baume so that the corn germ floats to the top of the slurry, recovering the corn germ, incubating the ground corn slurry no longer containing the corn germ with at least one enzyme (amylase, protease, cell wall degrading enzyme, or mixtures thereof) to increase the specific gravity of the slurry to about 11-about 16 Baume so that the corn coarse fiber floats to the top of the slurry, recovering the corn coarse fiber, and optionally producing ethanol from the slurry no longer containing the corn germ and corn coarse fiber. The process does not involve the addition of starch, a salt, a sugar syrup, or mixtures thereof to the slurry.

Additionally, in accordance with the present invention, there is provided a process for recovering corn germ from corn in a dry grind process, involving soaking corn kernels in water to produce soaked corn kernels, grinding the soaked corn kernels to produce a ground corn slurry, and incubating the ground corn slurry with at least one enzyme (amylase, protease, cell wall degrading enzyme, or mixtures thereof) to increase the specific gravity of the slurry to about 7-about 11 Baume so that the corn germ floats to the top of the slurry, recovering the corn germ, and optionally producing ethanol from the slurry no longer containing the corn germ. The process does not involve the addition of starch, a salt, a sugar syrup, or mixtures thereof to the slurry.

DETAILED DESCRIPTION OF THE INVENTION

Figure 1:
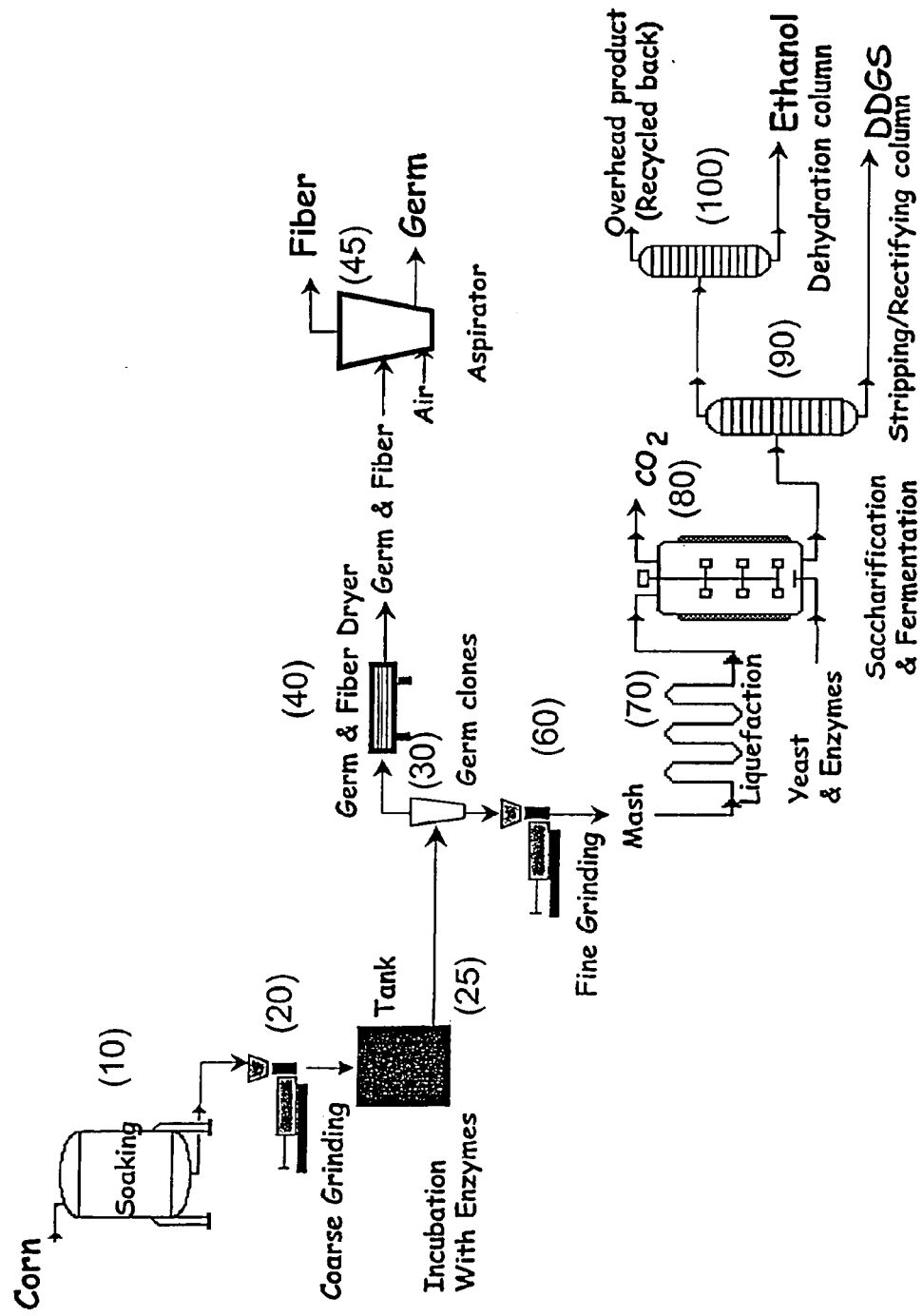
FIG. 1 shows a process of simultaneously recovering germ and pericarp from corn.

The present invention relates generally to the recovery of corn germ and optionally corn coarse fiber (pericarp) from corn, and more particularly to processes for the recovery of corn germ and optionally corn coarse fiber by flotation (e.g., through the use of enzymes such as amylases, proteases, cell wall degrading enzymes, or any combination thereof).

In general, amylases are a sub-class of the glycosidases which are enzymes that hydrolyze O- and S-glycosyl bonds. The amylases act on starch, glycogen and related polysaccharides and oligosaccharides to hydrolyze these substrates to produce smaller polysaccharides, oligosaccharides and/or monosaccharides. Members of this sub-class include, for example, amylase, alpha-amylase, beta-amylase, glucoamylase, alpha-glucosidase, pullulanase, glucan 1,4-alpha-maltotetrahydrolase, isoamylase, glucan 1,4-alpha-maltohexaosidase, maltogenic alpha-amylase, and limit dextrinase.

Protease is a general name for any enzyme that hydrolyzes the peptide bonds in protein and peptides to produce smaller proteins, peptides and amino acids. Members of this class of enzymes include, for example, aminopeptidases, dipeptidases, dipeptidyl-peptidases and tripeptidyl-peptidases, peptidyl-dipeptidases, serine-type carboxypeptidases, metallocarboxypeptidases, cysteine-type carboxypeptidases, omega peptidases, serine endopeptidases, cysteine endopeptidases, aspartic endopeptidases, metalloendopeptidases, and threonine endopeptidases.

Cell wall degrading enzymes are enzymes that hydrolyze any of the polysaccharide components making up the plant cell wall. In general the cell wall degrading enzymes are referred to as cellulase, hemicellulase, xylanase, pectinase, mananase, arabinosidase as well as others names depending on their specific hydrolytic activity. These generally do not include the amylases although amylases may have a limited hydrolyzing activity on select cell wall components.

The amylases, proteases and cell wall degrading enzymes that can be used in the processes described herein must have the ability to alter the Baume (specific gravity) of a corn slurry through the hydrolysis of endogenous components sufficiently such that the germ can be recovered by floatation or the germ and fiber float together and can be recovered by floatation or the germ and fiber float separately and can be recovered by floatation.

Known amylases, proteases and cell wall degrading enzymes can be found in Nucleic Acids Res., 28:304–305 (2000)(Bairoch, A., The ENZYME database in 2000) and at http://www.expasy.org/enzyme.

I. Simultaneous recovery of germ and fiber:

One aspect of the present invention concerns a process for recovering corn germ and corn coarse fiber from corn in a dry grind process, involving soaking corn kernels in water to produce soaked corn kernels, grinding the soaked corn kernels to produce a ground corn slurry, and incubating the ground corn slurry with one or more enzymes (e.g., amylases, proteases, cell wall degrading enzymes, or mixtures thereof, and optionally other enzymes) to increase the specific gravity of the slurry to about 10-about 16 Baume so that the corn germ and corn coarse fiber floats to the top of the slurry, recovering the corn germ and the corn coarse fiber, and optionally producing ethanol from the slurry no longer containing the corn germ and corn coarse fiber.

Referring now to FIG. 1, a process of simultaneously recovering germ and pericarp from corn will be described. First, raw corn kernels (preferably dent corn, but other varieties are also acceptable) are fed into a water filled vat 10 for soaking for between about 3-about 12 hours (e.g, 3–12 hours)(preferably the corn kernels are soaked for between about 4 and about 8 hours (e.g., 4–8 hours), more preferably for between about 5 and about 7 hours (e.g., 5–7 hours), most preferably for about 6 hours (e.g., 6 hours)) at a temperature of between about 45° and about 70° C. (e.g., 45°–70° C.)(preferably at a temperature of between about 50 and about 65° C. (e.g., 50°–65° C.), more preferably between about 55' and about 60° C. (e.g., 55°–60° C.), and preferably below the temperature at which corn starch gelatinizes); it is within the skill of one skilled in the art based on the examples herein to optimize soaking time and temperature. It is also preferred that distilled water be used in the vat 10. However, water recycled from other steps of the process may also be used for soaking the corn, including the thin stillage produced at the downstream end of the process. The ratio of corn to water is preferably within the range of approximately 1:1.5 and 1:2. Generally the pH of the water does not have to be adjusted; the pH is generally about 7.

After soaking, the excess water is removed from the corn. Next, the kernels are fed into a degermination mill 20 (such as a Bauer mill) where they are ground so that the pericarp and the germ are stripped away from the endosperm. Preferably, the excess water that was removed from the corn after soaking is recycled into various parts of the process. For example, part of the excess water can be used along with the soaked corn to feed the degermination mill 20 (the water lubricated the mill to prevent it from plugging). Part of this excess water can also be used to wash the germ and fiber (after their removal described below). The remaining water can be used to make the mash, which can be further processed to make ethanol (as described below).

After leaving the degermination mill 20, the slurry is fed into a tank 25 where the slurry is incubated with added enzymes. In order to separate the germ and pericarp from the remainder of the slurry, the specific gravity of the slurry must be increased through the addition of one or more enzymes (e.g., amylases, proteases, cell wall degrading enzymes, or mixtures thereof); the initial specific gravity of the slurry containing germ and pericarp is about 3–5 Baume. Generally the specific gravity of the slurry is increased to between about 10 and about 16 Baume (e.g., 10–16 Baume), preferably the specific gravity of the slurry is increased to between about 11 and about 16 Baume (e.g., 11–16 Baume, or greater than about 11 Baume up to about 16 Baume), more preferably between about 11 and about 15 Baume (e.g., 11–15 Baume, or greater than about 11 Baume up to about 15 Baume), and most preferably between about 12 and about 14 Baume (e.g., 12–14 Baume). However, a specific gravity of greater than approximately 16 Baume is not recommended because at such values the slurry becomes too thick to permit effective removal of the pericarp. This enzyme incubation step is conducted generally at a pH of between about 2.5 and about 7 (e.g., 2.5–7)(preferably between about 3 and about 6.5 (e.g., 3–6.5), more preferably between about 3.5 and about 6 (e.g., 3.5–6), and most preferably between about 4 and about 5 (e.g., 4–5)), at a temperature between about 25° and about 70° C. (e.g., 25°–70° C.)(preferably between about 30° and about 65° C. (e.g., 30°–65° C.), more preferably between about 35° and about 60° C. (e.g., 35°–60° C.), more preferably between about 40° and about 55° C. (e.g., 40°–55° C.), most preferably between about 45° and about 50° C. (e.g., 45°–50° C.), and preferably below the temperature at which corn starch gelatinizes), and at an incubation time between about 10 minutes and about 4 hours (e.g., 10 minutes–4 hours)(preferably between about 30 minutes and about 3 hours (e.g., 30 minutes–3 hours), more preferably between about 1 and about 2.5 hours (e.g., 1–2.5 hours), and most preferably at about 2 hours (e.g., 2 hours)); it is within the skill of one skilled in the art based on the examples herein to optimize the incubation pH, time and temperature for specific enzymes. The concentration of the enzymes used is generally between about 1 mg and about 1000 mg per 100 g of corn (e.g., 1–1000 mg)(preferably between about 1 mg and about 100 mg per 100 g of corn (e.g., 1–100 mg), more preferably between about 1 mg and about 50 mg per 100 g of corn (e.g., 1–50 mg), and most preferably between about 1 mg and about 10 mg per 100 g of corn (e.g., 1–10 mg); it is within the skill of one skilled in the art based on the examples herein to optimize the concentration of specific enzymes.

After leaving the tank 25, the slurry is fed into a hydrocyclone 30, or other similar separating device, where the germ and pericarp are separated from the remainder of the slurry (because the germ and pericarp are of a lighter density than the remainder of the slurry, they float to the top of the hydrocyclone 30, and can be removed; it is also contemplated that other germ and pericarp separation techniques, which also utilize the density difference between the germ and pericarp and the slurry with its specific gravity increased, may also be utilized). During this step of the process, the slurry is preferably tangentially fed into the hydrocyclone 30 under pressure. The heavier particles pass through the underflow of the hydrocyclone 30 and the lighter particles that float (such as the germ and pericarp) are separated out into the overflow of the hydrocyclone 30. The germ and pericarp from the overflow of the hydrocyclone 30 is washed, dewatered and then fed into a dryer 40. After leaving the dryer 40, the pericarp and germ are separated, for example by use of an aspirator 45.

The slurry, which is now lacking both the germ and the pericarp, may be used to produce ethanol. The slurry is next fed into a second grinder 60 for fine-grinding it into a mash. Saccharification enzymes are then added to the mash, and this mixture is then fed into the saccharification area 70 where it is saccharified (i.e., the complex carbohydrates, such as starch, are converted into glucose and maltose through the use of enzymes or acids). From here, yeast is added to the mash, and it is fermented in a fermentor 80. Then, it passes to a stripping/rectifying column 90, and finally it passes into a dehydration (distillation) column 100 where it is distilled into ethanol. One co-product coming out of the stripping/rectifying column 90 is distillers dried grains with solubles (DDGS). The byproduct of the dehydration column 100 is an overhead product, such as benzene, that is used to remove water from the ethanol. The overhead product is then recycled back into the process. Alternatively, molecular sieves may be used for the final dehydration steps.

By removing the pericarp and the germ from the slurry, instead of letting it pass through all of the process steps as in conventional dry grind processes, the amount of non-fermentable materials passing through the fermentor is decreased (both the pericarp and the germ are non-fermentables). Accordingly, the capacity of the fermentors is effectively increased (because the same amount of corn feed product will result in less product being introduced into the fermentors and the later process steps). For example, it has been found that the pericarp alone accounts for approximately 6–7% of the volume of the corn; thus, if the present invention is utilized to remove the pericarp, there will be a 6–7% decrease in the volume of material being fed into the fermentors (when compared to the same amount of corn feed product in a standard dry-grind plant). Greater decreases in the volume of materials being fed into the fermentors will result when the germ is also removed (as well as the pericarp).

II. Sequential recovery of germ and fiber:

Another aspect of the present invention concerns a process for recovering corn germ and corn coarse fiber from corn in a dry grind process, involving soaking corn kernels in water to produce soaked corn kernels, grinding the soaked corn kernels to produce a ground corn slurry, incubating the ground corn slurry with one or more enzymes (e.g., amylases, proteases, cell wall degrading enzymes, or mixtures thereof, and optionally other enzymes) to increase the specific gravity of the slurry to about 7-about 11 Baume so that the corn germ floats to the top of the slurry, recovering the corn germ, incubating the ground corn slurry no longer containing the corn germ with one or more enzymes (e.g., amylases, proteases, cell wall degrading enzymes, or mixtures thereof, and optionally other enzymes) to increase the specific gravity of the slurry to about 11-about 16 Baume so that the corn coarse fiber floats to the top of the slurry, recovering the corn coarse fiber, and optionally producing ethanol from the slurry no longer containing the corn germ and corn coarse fiber.

Figure 2:
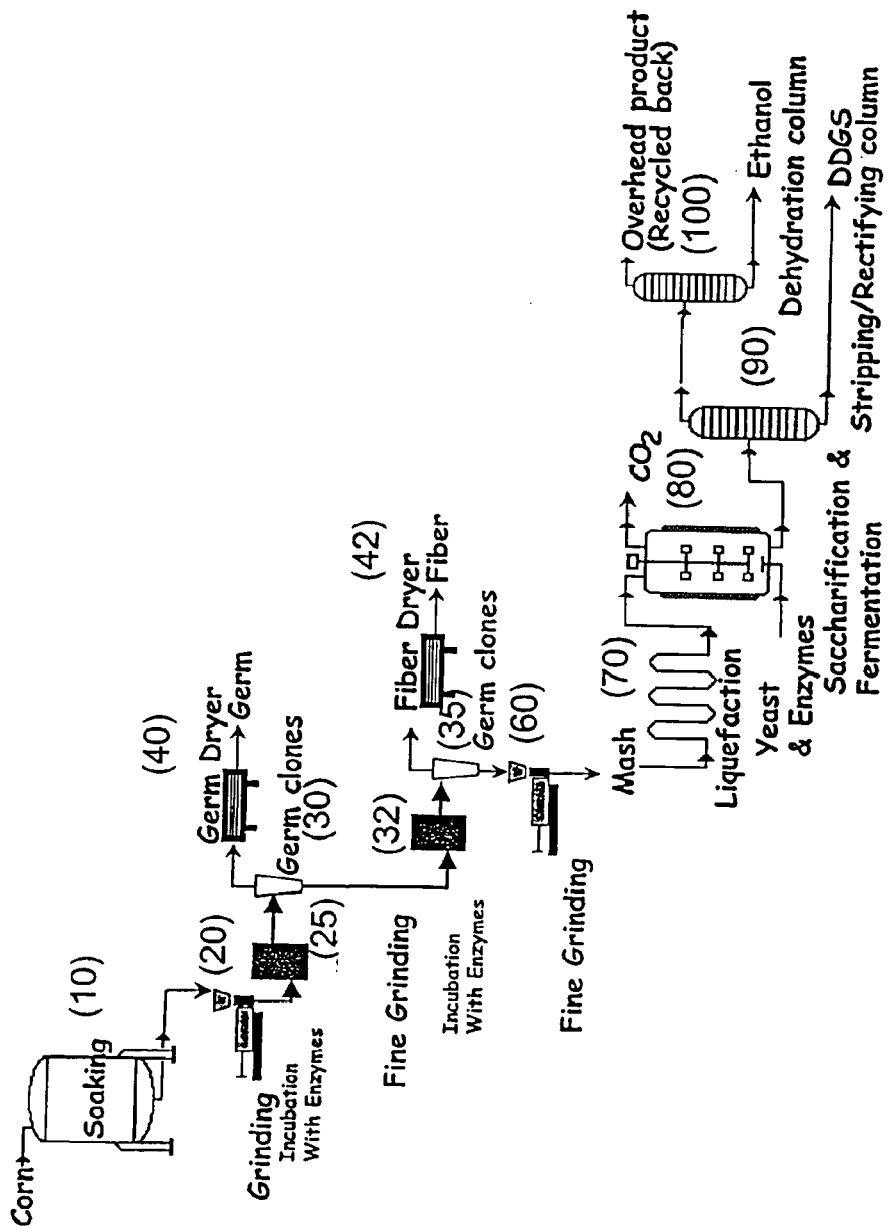
FIG. 2 shows a process of sequentially recovering germ and then pericarp from corn.

Referring now to FIG. 2, a process of sequentially recovering germ and then pericarp from corn will be described. First, raw corn kernels (preferably dent corn, but other varieties are also acceptable) are fed into a water filled vat 10 for soaking for between about 3-about 12 hours (e.g, 3–12 hours)(preferably the corn kernels are soaked for between about 4 and about 8 hours (e.g., 48 hours), more preferably for between about 5 and about 7 hours (e.g., 5–7 hours), most preferably for about 6 hours (e.g., 6 hours)) at a temperature of between about 45° and about 70° C. (e.g., 45°–70° C.)(preferably at a temperature of between about 50° and about 65° C. (e.g., 50°–65° C.), more preferably between about 55° and about 60° C. (e.g., 55°–60° C.) and preferably below the temperature at which corn starch gelatinizes); it is within the skill of one skilled in the art based on the examples herein to optimize soaking time and temperature. It is also preferred that distilled water be used in the vat 10. However, water recycled from other steps of the process may also be used for soaking the corn, including the thin stillage produced at the downstream end of the process. The ratio of corn to water is preferably within the range of approximately 1:1.5 and 1:2. Generally the pH of the water does not have to be adjusted; the pH is generally about 7.

After soaking, the excess water is removed from the corn. Next, the kernels are fed into a degermination mill 20 (such as a Bauer mill) where they are ground so that the pericarp and the germ are stripped away from the endosperm.

Preferably, the excess water that was removed from the corn after soaking is recycled into various parts of the process. For example, part of the excess water can be used along with the soaked corn to feed the degermination mill 20 (the water lubricated the mill to prevent it from plugging). Part of this excess water can also be used to wash the germ and fiber (after their removal described below). The remaining water can be used to make the mash, which can be further processed to make ethanol (as described below).

After leaving the degermination mill 20, the slurry is fed into a tank 25 where the slurry is incubated with added enzymes. In order to separate the germ from the remainder of the slurry, the specific gravity of the slurry must be increased through the addition of one or more enzymes (e.g., amylases, proteases, cell wall degrading enzymes, or mixtures thereof, and optionally other enzymes). Generally the specific gravity of the slurry is increased to between about 7 and about 11 Baume (e.g., 7–11 Baume, or between about 7 and less than about 11 Baume), preferably the specific gravity of the slurry is increased to between about 7.5 and about 10.5 Baume (e.g., 7.5–10.5 Baume), more preferably between about 8 and about 10 Baume (e.g., 8–10 Baume), and most preferably between about 8.5 and about 9.5 Baume (e.g., 8.5–9.5 Baume). This enzyme incubation step is conducted generally at a pH of between about 2.5 and about 7 (e.g., 2.5–7)(preferably between about 3 and about 6.5 (e.g., 3–6.5), more preferably between about 3.5 and about 6 (e.g., 3.5–6), and most preferably between about 4 and about 5 (e.g., 4–5)), at a temperature between about 25° and about 70° C. (e.g., 25°–70° C.)(preferably between about 30° and about 65° C. (e.g., 30°–65° C.), more preferably between about 35° and about 60° C. (e.g., 35°–60° C.), more preferably between about 40° and about 55° C. (e.g., 40°–55° C.), most preferably between about 45° and about 50° C. (e.g., 45°–50° C.), and preferably below the temperature at which corn starch gelatinizes), and at an incubation time between about 10 minutes and 4 hours (e.g., 10 minutes–4 hours)(preferably between about 30 minutes and about 3 hours (e.g., 30 minutes–3 hours), more preferably between about 1 and about 2.5 hours (e.g., 1–2.5 hours), and most preferably at about 2 hours (e.g., 2 hours)); it is within the skill of one skilled in the art based on the examples herein to optimize the incubation pH, time and temperature for specific enzymes. The concentration of the enzymes used is generally between about 1 mg and about 1000 mg per 100 g of corn (e.g., 1–1000 mg)(preferably between about 1 mg and about 100 mg per 100 g of corn (e.g., 1–100 mg), more preferably between about 1 mg and about 50 mg per 100 g of corn (e.g., 1–50 mg), and most preferably between about 1 mg and about 10 mg per 100 g of corn (e.g., 1–10 mg); it is within the skill of one skilled in the art based on the examples herein to optimize the concentration of specific enzymes.

After leaving the tank 25, the slurry is fed into a hydrocyclone 30, or other similar separating device, where the germ is separated from the remainder of the slurry (because the germ is of a lighter density than the remainder of the slurry, it floats to the top of the hydrocyclone 30, and can be removed; it is also contemplated that other germ separation techniques, which also utilize the density difference between the germ and the slurry with its specific gravity increased, may also be utilized). During this step of the process, the slurry is preferably tangentially fed into the hydrocyclone 30 under pressure. The heavier particles pass through the underflow of the hydrocyclone 30 and the lighter particles that float (such as the germ) are separated out into the overflow of the hydrocyclone 30. The germ from the overflow of the hydrocyclone 30 is washed, denatured and then fed into a dryer 40.

The remainder of the slurry, which is now lacking the germ, is fed into a tank 32. In order to separate the pericarp from the remainder of the slurry, the specific gravity of the slurry must be increased through the addition of one or more enzymes (e.g., amylases, proteases, cell wall degrading enzymes, or mixtures thereof, and optionally other enzymes). Generally the specific gravity of the slurry is increased to between about 10 and about 16 Baume (e.g., 10–16 Baume), preferably the specific gravity of the slurry is increased to between about 11 and about 16 Baume (e.g., 11–16 Baume, or greater than about 11 Baume up to about 16 Baume), more preferably between about 11 and about 15 Baume (e.g., 11–15 Baume, or greater than about 11 Baume up to about 15 Baume), and most preferably between about 12 and about 14 Baume (e.g., 12–14 Baume). However, a specific gravity of greater than approximately 16 Baume is not recommended because at such values the slurry becomes too thick to permit effective removal of the pericarp. This enzyme incubation step is conducted generally at a pH of between about 2.5 and about 7 (e.g., 2.5–7)(preferably between about 3 and about 6.5 (e.g., 3–6.5), more preferably between about 3.5 and about 6 (e.g., 3.5–6), and most preferably between about 4 and about 5 (e.g., 4–5)), at a temperature between about 25° and about 70° C. (e.g., 25°–70° C.)(preferably between about 30° and about 65° C. (e.g., 30°–65° C.), more preferably between about 35° and about 60° C. (e.g., 35°–60° C.), more preferably between about 40° and about 55° C. (e.g., 40°–55° C.), most preferably between about 45° and about 50° C. (e.g., 45°–50° C.), and preferably below the temperature at which corn starch gelatinzes), and at an incubation time between about 10 minutes and 4 hours (e.g., 10 minutes–4 hours) (preferably between about 30 minutes and about 3 hours (e.g., 30 minutes–3 hours), more preferably between about 1 and about 2.5 hours (e.g., 1–2.5 hours), and most preferably at about 2 hours (e.g., 2 hours)); it is within the skill of one skilled in the art based on the examples herein to optimize the incubation pH, time and temperature for specific enzymes. The concentration of the enzymes used is generally between about 1 mg and about 1000 mg per 100 g of corn (e.g., 1–1000 mg)(preferably between about 1 mg and about 100 mg per 100 g of corn (e.g., 1–100 mg), more preferably between about 1 mg and about 50 mg per 100 g of corn (e.g., 1–50 mg), and most preferably between about 1 mg and about 10 mg per 100 g of corn (e.g., 1–10 mg); it is within the skill of one skilled in the art based on the examples herein to optimize the concentration of specific enzymes.

After leaving the tank 32, the slurry is fed into a second hydrocyclone 35. In this hydrocyclone 35 the pericarp is separated from the remainder of the slurry by flotation. Because the pericarp is of a lighter density than the remainder of the slurry, it floats to the top of the hydrocyclone 35, and can be removed. It is also contemplated that other pericarp separation techniques, which also utilize the density difference between the pericarp and the slurry with its specific gravity increased, may also be utilized. The pericarp from the overflow of the hydrocyclone 35 is washed, denatured and then fed into a dryer 42.

The slurry, which is now lacking both the germ and the pericarp, may be used to produce ethanol. The slurry is next fed into a second grinder 60 for fine-grinding it into a mash. Saccharification enzymes are then added to the mash, and this mixture is then fed into the saccharification area 70 where it is saccharified (i.e., the complex carbohydrates, such as starch, are converted into glucose and maltose through the use of enzymes or acids). From here, yeast is added to the mash, and it is fermented in a fermentor 80. Then, it passes to a stripping/rectifying column 90, and finally it passes into a dehydration column 100 where it is distilled into ethanol. One co-product coming out of the stripping/rectifying column 90 is distillers dried grains with solubles (DDGS). The byproduct of the dehydration column 100 is an overhead product, such as benzene, that is used to remove water from the ethanol. The overhead product is then recycled back into the process. Alternatively, molecular sieves may be used for the final dehydration steps.

III. Recovery of germ:

Yet another aspect of the present invention concerns a process for recovering corn germ from corn in a dry grind process, involving soaking corn kernels in water to produce soaked corn kernels, grinding the soaked corn kernels to produce a ground corn slurry, and incubating the ground corn slurry with one or more enzymes (e.g., amylases, proteases, cell wall degrading enzymes, or mixtures thereof, and optionally other enzymes) to increase the specific gravity of the slurry to about 7-about 11 Baume so that the corn germ floats to the top of the slurry, recovering the corn germ, and optionally producing ethanol from the slurry no longer containing the corn germ.

Figure 3:
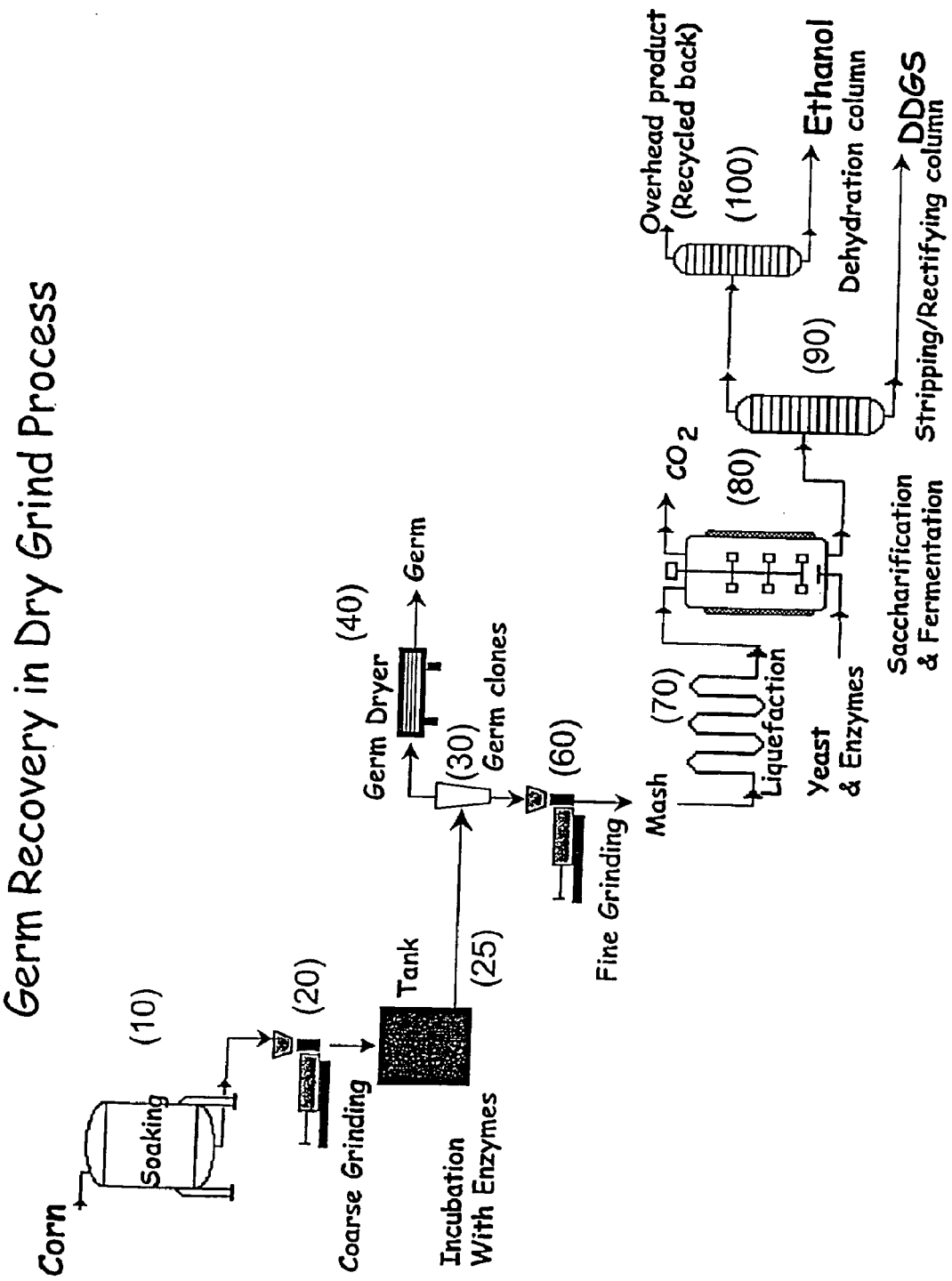
FIG. 3 shows a process of recovering germ from corn.

Referring now to FIG. 3, a process of recovering germ from corn will be described. First, raw corn kernels (preferably dent corn, but other varieties are also acceptable) are fed into a water filled vat 10 for soaking for between about 3-about 12 hours (e.g, 3–12 hours)(preferably the corn kernels are soaked for between about 4 and about 8 hours (e.g., 4–8 hours), more preferably for between about 5 and about 7 hours (e.g., 5–7 hours), most preferably for about 6 hours (e.g., 6 hours)) at a temperature of between about 45° and about 70° C. (e.g., 45°–70° C.)(preferably at a temperature of between about 50° and about 65° C. (e.g., 50°–65° C.), more preferably between about 55° and about 60° C. (e.g., 55°–60° C.) and preferably below the temperature at which corn starch gelatinizes); it is within the skill of one skilled in the art based on the examples herein to optimize soaking time and temperature. It is also preferred that distilled water be used in the vat 10. However, water recycled from other steps of the process may also be used for soaking the corn, including the thin stillage produced at the downstream end of the process. The ratio of corn to water is preferably within the range of approximately 1:1.5 and 1:2. Generally the pH of the water does not have to be adjusted; the pH is generally about 7.

After soaking, the excess water is removed from the corn. Next, the kernels are fed into a degermination mill 20 (such as a Bauer mill) where they are ground so that the pericarp and the germ are stripped away from the endosperm. Preferably, the excess water that was removed from the corn after soaking is recycled into various parts of the process. For example, part of the excess water can be used along with the soaked corn to feed the degermination mill 20 (the water lubricated the mill to prevent it from plugging). Part of this excess water can also be used to wash the germ and fiber (after their removal described below). The remaining water can be used to make the mash, which can be further processed to make ethanol (as described below).

After leaving the degermination mill 20, the slurry is fed into a tank 25. In order to separate the germ from the remainder of the slurry, the specific gravity of the slurry must be increased through the addition of one or more enzymes (e.g., amylases, proteases, cell wall degrading enzymes, or mixtures thereof, and optionally other enzymes). Generally the specific gravity of the slurry is increased to between about 7 and about 11 Baume (e.g., 7–11 Baume, or between about 7 and less than about 11 Baume), preferably the specific gravity of the slurry is increased to between about 7.5 and about 10.5 Baume (e.g., 7.5–10.5 Baume), more preferably between about 8 and about 10 Baume (e.g., 8–10 Baume), and most preferably between about 8.5 and about 9.5 Baume (e.g., 8.5–9.5 Baume). This enzyme incubation step is conducted generally at a pH of between about 2.5 and about 7 (e.g., 2.5–7)(preferably between about 3 and about 6.5 (e.g., 3–6.5), more preferably between about 3.5 and about 6 (e.g., 3.5–6), and most preferably between about 4 and about 5 (e.g., 4–5)), at a temperature between about 25° and about 70° C. (e.g., 25°–70° C.)(preferably between about 30° and about 65° C. (e.g., 30°–65° C.), more preferably between about 35° and about 60° C. (e.g., 35°–60° C.), more preferably between about 40° and about 55° C. (e.g., 40°–55° C.), most preferably between about 45° and about 50° C. (e.g., 45°–50° C.), and preferably below the temperature at which corn starch gelatinizes), and at an incubation time between about 10 minutes and 4 hours (e.g., 10 minutes–4 hours)(preferably between about 30 minutes and about 3 hours (e.g., 30 minutes–3 hours), more preferably between about 1 and about 2.5 hours (e.g., 1–2.5 hours), and most preferably at about 2 hours (e.g., 2 hours)); it is within the skill of one skilled in the art based on the examples herein to optimize the incubation pH, time and temperature for specific enzymes. The concentration of the enzymes used is generally between about 1 mg and about 1000 mg per 100 g of corn (e.g., 1–1000 mg)(preferably between about 1 mg and about 100 mg per 100 g of corn (e.g., 1–100 mg), more preferably between about 1 mg and about 50 mg per 100 g of corn (e.g., 1–50 mg), and most preferably between about 1 mg and about 10 mg per 100 g of corn (e.g., 1–10 mg); it is within the skill of one skilled in the art based on the examples herein to optimize the concentration of specific enzymes.

After leaving the tank 25, the slurry is fed into a hydrocyclone 30, or other similar separating device, where the germ is separated from the remainder of the slurry (because the germ is of a lighter density than the remainder of the slurry, it floats to the top of the hydrocyclone 30, and can be removed; it is also contemplated that other germ separation techniques, which also utilize the density difference between the germ and the slurry with its specific gravity increased, may also be utilized). During this step of the process, the slurry is preferably tangentially fed into the hydrocyclone 30 under pressure. The heavier particles pass through the underflow of the hydrocyclone 30 and the lighter particles that float (such as the germ) are separated out into the overflow of the hydrocyclone 30. The germ from the overflow of the hydrocyclone 30 is washed, denatured and then fed into a dryer 40.

The slurry, which is now lacking both the germ and the pericarp, may be used to produce ethanol. The slurry is next fed into a second grinder 60 for fine-grinding it into a mash (the pericarp may be first removed, for example, by screening). Saccharification enzymes are then added to the mash, and this mixture is then fed into the saccharification area 70 where it is saccharified (i.e., the complex carbohydrates, such as starch, are converted into glucose and maltose through the use of enzymes or acids). From here, yeast is added to the mash, and it is fermented in a fermentor 80. Then, it passes to a stripping/rectifying column 90, and finally it passes into a dehydration column 100 where it is distilled into ethanol. One co-product coming out of the stripping/rectifying column 90 is distillers dried grains with solubles (DDGS). The byproduct of the dehydration column 100 is an overhead product, such as benzene, that is used to remove water from the ethanol. The overhead product is then recycled back into the process. Alternatively, molecular sieves may be used for the final dehydration steps.

In all of the above described processes:

The corn kernels are generally soaked between about 3-about 12 hours (the processes do not involve soaking for more than 16 hours, preferably no more than about 14 hours) and preferably below the temperature at which corn starch gelatinizes, and the soak water generally contains about 0 ppm $SO_2$ (e.g., 0 ppm). The hydrated corn kernels are coarsely ground (preferably at a temperature below the temperature at which corn starch gelatinizes) to form a ground corn slurry. After initial hydration, corn will normally be ground using a degermination mill (particle reduction device commonly used in corn wet-milling industry) or similar equipment. Degermination mills are usually equipped with one fixed and one rotating Devil's tooth plate which mesh closely and are designed specifically for corn. Mill plates can be adjusted for gap settings. The plate gap setting and the rpm of the mill controls the impact and shearing force on the kernels and, therefore, affects the quality of germ recovered. Initial hydration of corn is done to get enough water in the corn kernel so that the germ will not break when corn is ground using a degermination mill.

The ground corn slurry is incubated with one or more enzymes (e.g., amylases, proteases, cell wall degrading enzymes, or mixtures thereof, and optionally other enzymes); the incubation temperature can be changed depending on the specific enzyme used, but generally would not go above the gelatinization temperature of about 70° C. or above the thermal stability of the enzyme. The incubation time can be increased so less enzyme can be used. If more than one enzyme is used (e.g., an amylase and a protease), then the enzymes may be used simultaneously or sequentially, in part depending on the specific activity range of the enzymes; for example, the enzymes would be used sequentially if the enzymes have very different pH optimums such that they needed to be added sequentially with a pH change to maximize the effects.

It is within the skill of one skilled in the art based on the examples herein to determine which amylases, proteases, cell wall degrading enzymes, or any combination thereof can be successfully utilized in the present invention; for example, there is a protease in the corn kernel that may be useful in the release of starch granules. Selection of other enzymes that could be used in this process would need to consider activity and stability under the specific conditions used. Such enzymes would need to have the ability to hydrolyze the proteins surrounding the starch granules. As a result, enzymes would be selected that have specificity toward peptide linkages in glutelins and zein (and more minor) corn endosperm proteins. Resulting peptides would then be separated during processing. The reaction conditions would need to consider enzyme concentration, pH, temperature, and other enzyme specific factors such as mineral or cofactor requirement.

Enzymes which can be used in the present invention include amylases with high native starch activity (e.g., a commercial betaglucanase preparation), proteases, cell wall degrading enzymes, and mixtures thereof. It is also likely that the addition of other polymer degrading enzymes in the herein modified dry grind ethanol process would increase the Be and therefore permit the separation of germ and fiber. These would include enzymes such as xylanase, hemicellulase, cellulase, arabinofuranosidase, β-amylase, glucoamylase, and possibly others. The type of enzyme would be limited based on its particular influence on the glucose yield and the final ethanol yield. Enzymes that would not be useful would be those that created inhibitors of fermentation, inhibitors of starch degradation or decreased important nutrients needed for yeast health. The enzyme could be selected by experiments such as those described below.

After incubation with enzyme (e.g., amylase, protease, cell wall degrading enzyme, or mixtures thereof), the corn germ (and optionally corn coarse fiber) floats and is separated from the slurry for example using hydrocyclone (separation based on density difference) or other similar equipment; recovering of the corn germ and optionally corn coarse fiber is at a temperature below the temperature at which corn starch gelatinizes. Generally, dry grind conditions after removal of the corn germ (and optionally corn coarse fiber) would be the same as used by the corn dry grind industry.

The present invention does not utilize the addition of starch (or thin sillage, salts such as sodium nitrate, sugar syrup such as high fructose corn syrup or dextrose) to affect floatation of the germ or pericarp. Another advantage of the present invention is that screening is generally not used to remove the germ and pericarp, thus reducing the costs of the production line. Furthermore, the present invention generally utilizes temperatures below the temperature at which corn starch gelatinizes (though if ethanol is produced then the starch is gelatinized after the corn germ and/or corn coarse fiber is removed from the slurry).

If the processes described herein did not use amylases, then corn syrups could be made instead of ethanol. It is within the skill of one skilled in the art based on the examples herein to produce such corn syrups.

Generally, in the saccharification step which may be used in the processes described herein, thermostable alpha-amylase is added to the slurry and the slurry is then heated to gelatinize the starch and "liquify" it at the same time. The amylase breaks down the starch sufficiently during this step to keep the viscosity fairly low. Then more amylase is added and the mash is held at an elevated temperature long enough to finish liquefying the mash. Then the liquified slurry is mixed with gluco-amylase to saccarify the partially hydrolyzed starch into glucose. This step is frequently done in the fermentation vessel with the yeast added. The gelatinization temperature is a narrow temperature range at which starch granules begin to swell, lose crystallinity and viscosify the cooking medium. Gelatinization of corn starches varies depending on the specific corn type and variety, and it can also be influenced by a variety of cultivation factors. Generally dent corn gelatinizes at 62–80° C. and waxy corn at 63–72° C. See Starches, David J. Thomas and William A. Atwell, The Eagan Press Handbook Series, 1998, ISBN 1-891127-01-2.

The following examples are intended only to further illustrate the invention and are not intended to limit the scope of the invention as defined by the claims.

EXAMPLES

Experiment 1: We conducted experiments in which we surprisingly recovered the germ and fiber using an amylase with high native starch activity (the preparation was a commercial betaglucanase). After soaking for 6 hr in water and coarse grinding, the slurry was incubated with the enzyme preparation (50 mg/100 g of corn) for 2 hrs at 45–48° C. with no additional starch added, pH 5.0. The Baume of the slurry was approximately 9. The germ floated very well and a high yield of the germ was easily recovered. Additional experimental results showed that other enzymes could also be used to increase the specific gravity of the slurry to improve separations of coproducts.

| Soak Time | Initial Be | Add Starch | Add Enz. | Final Be | Germ Yield (%) |
|---|---|---|---|---|---|
| 12 hrs | 3.8 | Yes | No | 8.5 | 5.90 |
| 6 hrs | 3.6 | No | Yes b-Glucanase | 9.0 | 6.57 |
| 6 hrs | 3.8 | No | Yes b-Glucanase | 9.8 | 20.52* |
| 4 hrs | 3 | No | Yes Protease | 9.0 | 6.07 |
| 6 hrs | 3.8 | No | Yes b-Glucanase | 9.2 | 6.2 |

*Includes fiber with germ

The processes described herein of using enzymes to hydrolyze components present in the corn kernel to increase the specific gravity (Baume) has a number of advantages over prior art processes where salts or starch or sugar syrup were added. One of the main advantages of the present processes is that the enzymatic hydrolysis surprisingly helps with the separation of components from one another by disruption of the interactions between the components. This is particularly true with the proteases and amylases as they remove material attached to the germ and fiber fractions. This hydrolysis surprisingly results in the production of cleaner co-product fractions and at the same time the release of material that increases the specific gravity allowing the separation of co-products by flotation to occur. Yet another advantage is that only a catalytic amount of material needs to be added. This helps maintain proper water balance during the processing and does not require handling, mixing or recycling of large quantities of additional materials.

Experiment 2: One objective of this study was to compare the present invention (enzymatic milling (E-Mill)) with the conventional dry grind corn process and determine their effects on fermentation characteristics and DDGS composition.

Materials and Methods

Experimental Material: A yellow dent corn hybrid grown during the 2002 crop season at the Agricultural Engineering Research Farm, University of Illinois at Urbana-Champaign, was field dried to approximately 15.0% moisture content and combine harvested. Corn samples were hand cleaned to remove broken corn and foreign material, packaged in plastic bags and stored at 4° C. until processing. Whole kernel moisture content was measured using a 103° C. convection oven method (Approved Methods of the AACC, 8th ed., Method 44-15A, 2000, The American Association of Cereal Chemists, St Paul, Minn.).

Conventional Dry Grind Laboratory Process: Conventional dry grind processing used a 500 g laboratory procedure. Corn samples were ground at 500 rpm in a laboratory hammer mill (model MHM4, Glen Mills Inc., Clifton, N.J.) equipped with a 2.0 mm sieve. Ground corn weighing 500 g (as is) was mixed with tap water at 35° C. to obtain mash having 25% solids (d.b.). All experiments were carried out in 3 L flasks with overhead drives (model DHOD-182, Bellco Glass, Vineland, N.J.) for agitation. Samples were liquefied by increasing the temperature of the slurry to 85±1° C. and adding 1 ml of alpha-amylase obtained from Sigma-Aldrich (alpha-amylase solution *Bacillus licheniformis*, type XII-A saline solution 500 to 1,000 units/mg protein, 1,4-alpha-D-glucan-glucanohydrolase, 9000-85-5). The slurry was held at 85° C. for 90 min with continuous agitation at 150 rpm. After 90 min, the slurry temperature was decreased to 60° C. Slurry pH was adjusted to 4.1 to 4.2 pH with 1N sulfuric acid solution. Saccharification of samples was done by adding 1 ml of glucoamylase obtained from Sigma-Aldrich (amyloglucosidase from *Aspergillus niger*, glucoamylase, 1,4-alpha-D-glucan glucohydrolase, exo-1,4-alpha-glucosidase, 9032-08-0) and holding the slurry at 60° C. for 2 hr with constant agitation at 150 rpm. For fermentation, the saccharified mash was cooled to 30° C. Two milliliters of yeast innoculum (prepared using the procedure by Wang et al. (Wang, S., et al., Cereal Chem., 76: 82–86 (1999)) was added to the saccharified mash. Free amino nitrogen (300 ppm) was provided by adding $(NH_4)_2SO_4$ as yeast nutrient.

Fermentation was carried out for 72 hr at 30° C. with continuous agitation at 50 rpm. Fermentation was monitored by taking 5 ml samples every 12 hr and measuring ethanol concentrations using HPLC. From each 5 ml sample, clear supernatant liquid was obtained by centifuging the sample at 2500 rpm (Model Durafuge 100, Precision, Winchester, Va.). Supernatant was passed through a $0.2\mu$ syringe filter into 1 ml vials. Filtered liquid was injected into an ion exclusion column (Aminex HPX-87H, Bio-Rad, Hercules, Calif.) maintained at 50° C. Sugars, organic acids and alcohols were eluted from the column with HPLC grade water containing 5 mM sulfuric acid. The elution rate was 0.6 mL/min. Separated components were detected with a refractive index detector (model 2414, Waters Corporation, Milford, Mass.). Data was processed using HPLC software (Waters Corporation).

After 72 hr of fermentation, the mash was heated to 85° C. for 2 hr to evaporate ethanol. Stillage (mash left after boiling) was poured into 2 L flat bottom, open aluminum pans and dried in a convective oven for 24 hr at 59° C. Dried stillage was called distillers dried grains with solubles (DDGS) and analyzed for crude protein, crude fat and acid detergent fiber by standard methods known in the art. The moisture content of the DDGS was determined using the two stage convection oven method (Approved Methods of the AACC, 8th ed., Method 44-18, 2000, The American Association of Cereal Chemists, St Paul, Minn.).

E-Mill Laboratory Process: For the E-Mill process the amount of corn was increased by 20% compared to the amount used for the conventional process (because of removal of germ, pericarp fiber and endosperm fiber). The E-Mill procedure was done by soaking 600 g samples for 12 hr. After soaking, samples were ground coarsely and incubated with a starch degrading enzyme (alpha-amylase *Bacillus amyloliquefaciens*, 1,4-a-D-glucan glucanohydrolase, 9000-85-5, MFCD008 1319) for 2 hr (55° C. and 5.0 pH) and then a protease enzyme (GC106, Genencor International Inc., Palo Alto, Calif.) for 2 hr (45° C. and 5.0 pH) with intermittent gentle mixing of the sample every 30 min. After the enzyme incubation step, germ and pericarp fiber were recovered using the procedures of Singh and Eckhoff (Singh, V., and Eckhoff, S. R., Cereal Chem., 73: 716–720 (1996)) and Singh et al. (Singh, V., et al., Cereal Chem., 76: 868–872 (1999)) though the germ and fiber recovery procedures were significantly modified to maintain specific gravity of slurry for recovery of germ and fiber, the modification included addition of a starch degrading enzyme and incubating the slurry for 4 hr after soaking and coarse grinding of the corn kernels. The slurry was screened through a standard 200 mesh (0.074 mm opening) sieve and washed with 100 ml distilled water to recover endosperm fiber. The amount of water in the E-Mill process was controlled to maintain the same amount of water used in the conventional dry grind process. The remaining material was liquefied, saccharified and fermented using the conventional dry grind procedure described above. Dried material recovered at the end of the E-Mill process was called DDGS.

All treatments (Conventional Dry Grind and E-Mill) were conducted with two replicates. Fermentation samples from both replicates were analyzed via HPLC with at least two determinations. HPLC analyses for each replicate were averaged. Fermentation profiles were generated and rate of fermentation was calculated for the linear portion of the fermentation profiles. Analysis of variance (ANOVA) and Duncan's multiple range test (The CORR procedure, pages 433–506 in SAS User's Guide: Statistics, 1990, The Statistical and Analysis System Institute, Inc., Cary, N.C.) were used to compare means of crude protein, crude fat, ash and acid detergent fiber in the DDGS. The level selected to show statistical significance was 5% $p<0.05$).

Process parameters for conventional and E-Mill dry grind ethanol processes are shown in Table I.

Results and Discussion

Figure 4:
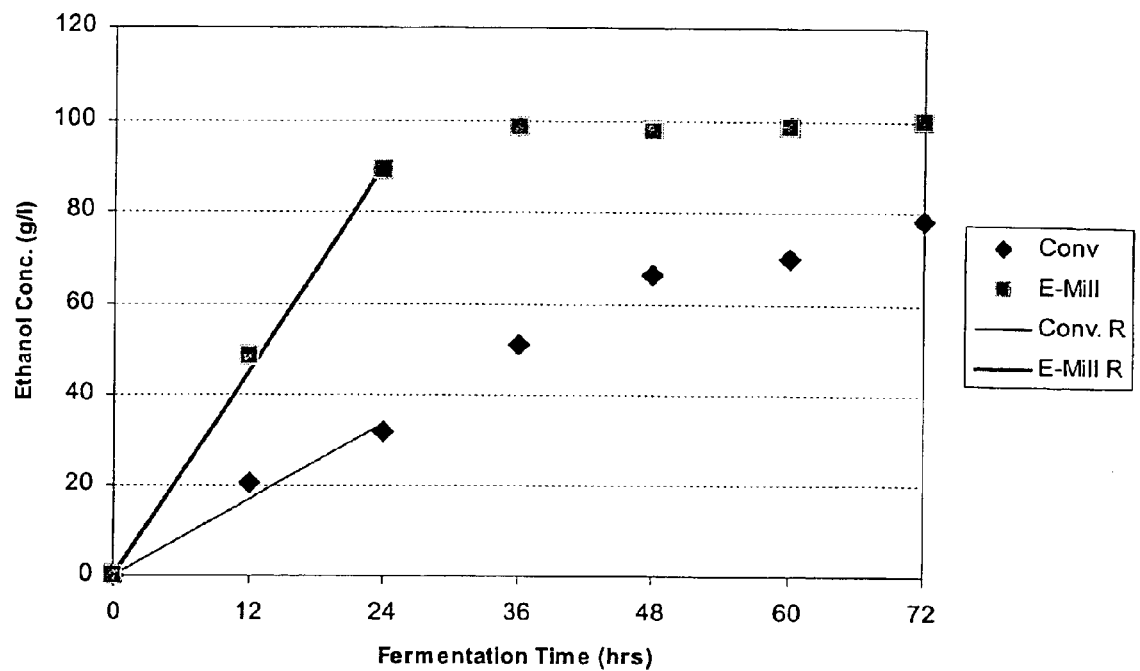
FIG. 4 shows rate of fermentation (ethanol concentrations versus fermentation times) for conventional (Conv.) and enzymatic milling (E-Mill) dry grind ethanol processes.

Fermentation Results:

Significant differences were observed in fermentation profiles of the E-Mill process compared to the conventional process (FIG. 4). As more nonfermentables (germ, pericarp fiber and endosperm fiber) are removed from the mash and replaced with fermentable substrate (corn), higher ethanol concentrations can be achieved. 27% higher ethanol concentration was obtained with the E-Mill process compared to the conventional process. The rate of fermentation for the E-Mill process increased from 1.41 to 3.77 g/l per hr as more nonfermentables were removed (FIG. 4). The likely reason for this increase in rate of fermentation was caused by better mixing of mash due to removal of suspended solids (germ, pericarp fiber and endosperm fiber) and more rapid heat transfer, leading to potentially higher rates of reaction. For the E-Mill process, fermentation reached a peak at 36 hr compared to the conventional process which peaked at 72 hr. The highest rate of fermentation was achieved for the E-Mill process (3.77 g/l per hr) because of lower amount of suspended solids and due to addition of protease.

Theoretically, removal of germ in the E-Mill process could cause foaming of process material. In conventional dry grind process, oil (in germ) floats on the top of fermentation broth and reduces air contact with proteins which could lead to foaming. However, no foaming was observed during the E-Mill process. The reason no foaming was observed was because germ was not recovered completely in the E-Mill process and some remains in the mash, resulting in small amounts of oil in the fermentation broth. Removal of germ (oil) will reduce the fouling of heat transfer surfaces in the dry grind process.

DDGS Composition:

Effect of the E-Mill process on DDGS composition was significant (Table II). The protein contents of DDGS material was surprisingly 58% for the E-Mill process. Protein content of DDGS for the E-Mill process (58%) was surprisingly higher than protein content of other high protein foodstuffs such as soybean meal (54%) (Table II).

Fat content of DDGS decreased compared to fat content of the conventional DDGS; the fat content of DDGS material was 12.7 and 4.5% for conventional and E-Mill processes, respectively. No differences were observed in ash contents of DDGS. Acid detergent fiber (ADF) content of DDGS was reduced; compared to conventional DDGS, ADF content was surprisingly reduced by 81% for the E-Mill process (Table 11).

Higher protein and lower fiber content can diversify DDGS as a more valuable foodstuff for nonruminant animals. This is important because the predicted growth in ethanol industry by California Energy Commission (MacDonald, T., et al., Ethanol supply outlook for California, California Energy Commission Report, 600-03-017F (2003)) could lead to over production of conventional DDGS and limited market demand as ruminant foodstuff.

Coproducts from the E-Mill process:

In addition to DDGS, several coproducts can be produced from the E-Mill process, including germ, pericarp fiber and endosperm fiber. Pericarp fiber from the E-Mill process can be used as feedstock for other valuable coproducts (Moreau, R. A., et al., Cereal Chem. 76(3):449451 (1999); Singh, V., et al., Cereal Chem. 77(5):560–561 (2000); Hicks, K. B., and Moreau, R. A., Food Tech. 55:63–67 (2001)). Germ recovery was surprisingly 8.1% from the E-Mill process (see Table III).

E-Mill process allows recovery of pericarp fiber and endosperm fiber separately. Researchers have shown that there are potentially valuable gums in corn fiber valued at $2.20 to 4.40/kg ($1 to 2/lb) (Doner, L. W., and Hick, K. B., Cereal Chem. 74(2):176–181 (1997); Doner, L. W., et al., Cereal Chem. 75(4):408411 (1998)); compositions and properties of these gums derived from pericarp fiber and endosperm fiber fractions (Singh, V., et al., Cereal Chem. 77(5):560–561 (2000)) are different. Therefore, E-Mill allows selective extraction of unique fiber fractions for gum manufacture. Recovery of valuable coproducts are important for the dry grind ethanol industry. These coproducts can reduce the cost of ethanol production.

Experiment 3 (Use of Enzymes to Alter the Slurry Baume of Ground Corn): One purpose of this experiment was to demonstrate the use of enzymes to hydrolyze substrates present in corn kernels (or other grains) to increase the specific gravity (Baume (Bé)) of the slurries to enhance the physical separation of co-products.

A number of components are present in corn in sufficient abundance to be hydrolyzed and have a significant affect on the Bé of the slurry. Starch, hemicellulose (arabinoxylan) and protein are likely candidates as there are a number of enzymes that could be use to hydrolyze these endogenous substrates.

Starch is an excellent choice in processes that do not seek to recover starch as a co-product, such as ethanol production. Hemicellulose and protein are better candidates for this process since they will not destroy the product and methods of recovery of partially hydrolyzed hemicellulose and protein will likely still be effective.

Methods of testing to demonstrate Be changes were as follows:

1. One kg of corn was soaked in 2 L of water for 6 hrs at 55° C.

2. The soak water was removed from the corn and the corn was divided into two equal amounts by weight. The corn was blended in a warring blender with the blades reversed with 750 mL of fresh water. The blending was done using a speed controller and rpm monitor. The blending was done for 3 min at 2500 rpm, 4 min at 2700 rpm, 2 min at 2700 rpm and 2 min at 3200 rpm.

3. The two batches were combined in a large beaker resulting in approximately 2.4 L of slurry. The slurry was adjusted to pH 5.0 with acetic acid.

4. Portions of the slurry (200–210 g) were distributed into 500 mL Erlenmeyer flasks containing stir bars. The flasks were placed in a water bath with submersible stir plates and equilibrated to 50° C.

5. Enzyme preparations were added to the flasks (2.0 mL per enzyme) and the flasks incubated for 3 hrs at 50° C. with stirring at 150 rpm. Controls were prepared by adding an equal amount of water rather than enzyme.

6. Following incubation the Bé and temperatures of the slurries were measured.

7. Bé values reported were corrected for the temperatures measured at the time the measurements were taken.

Starch degrading enzymes were used to investigate individual enzyme preparations and mixtures that could accelerate native starch hydrolysis.

Proteases investigated were mainly enzymes with broad hydrolytic specificity, but in a few instances were combined with the use of starch degrading enzymes.

Hemicellulose degrading enzymes investigated were individual enzyme preparations; however, they could be used in combination with other enzymes. The reason mixtures of hemicellulose degrading enzymes were not investigated in combination with other enzymes was because these preparations tend to already have a broad range of enzyme activities.

Figure 5:
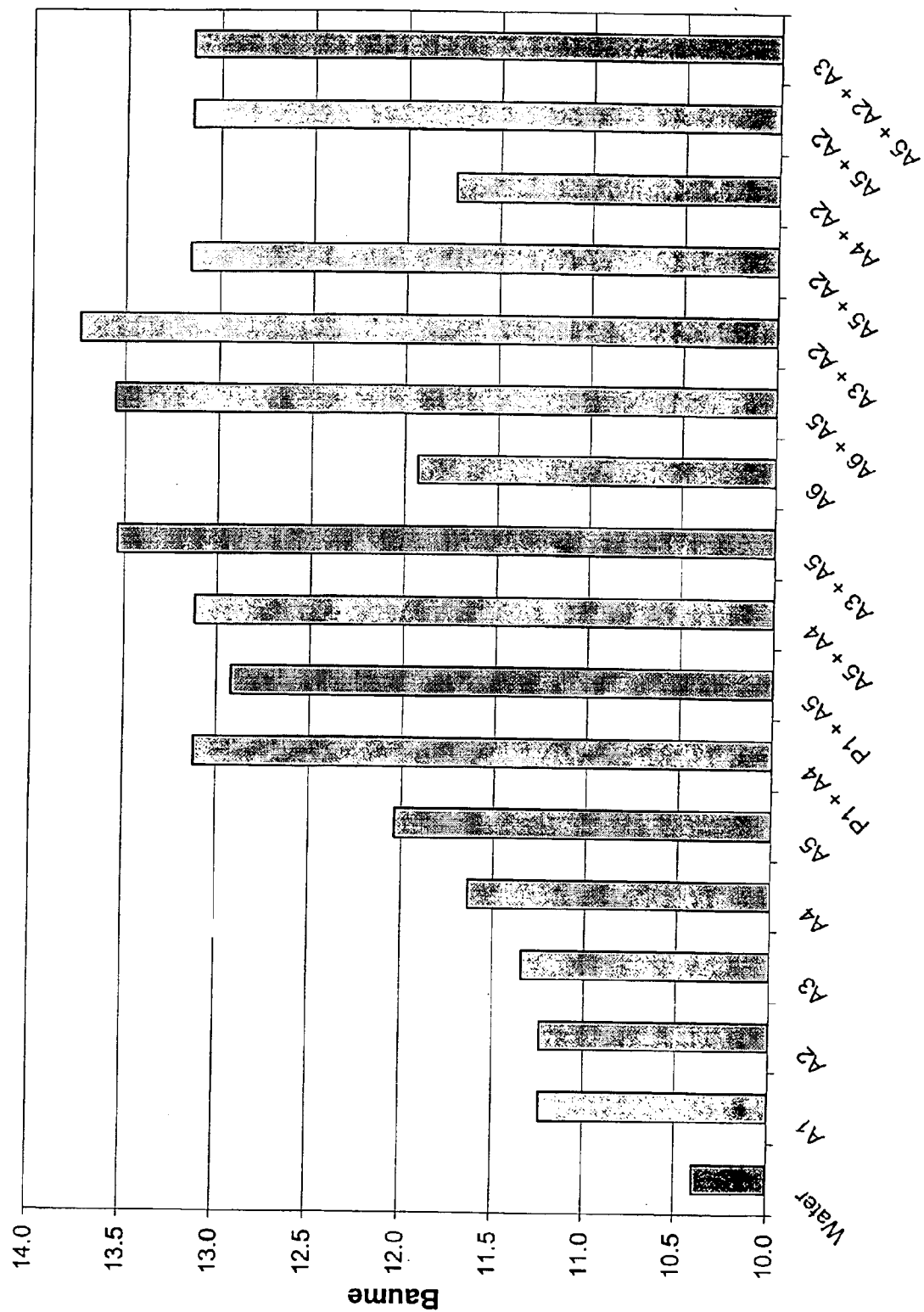
FIGS. 5–7 show changes in corn slurry Baume of ground corn due to the use of various enzymes.
Figure 6:
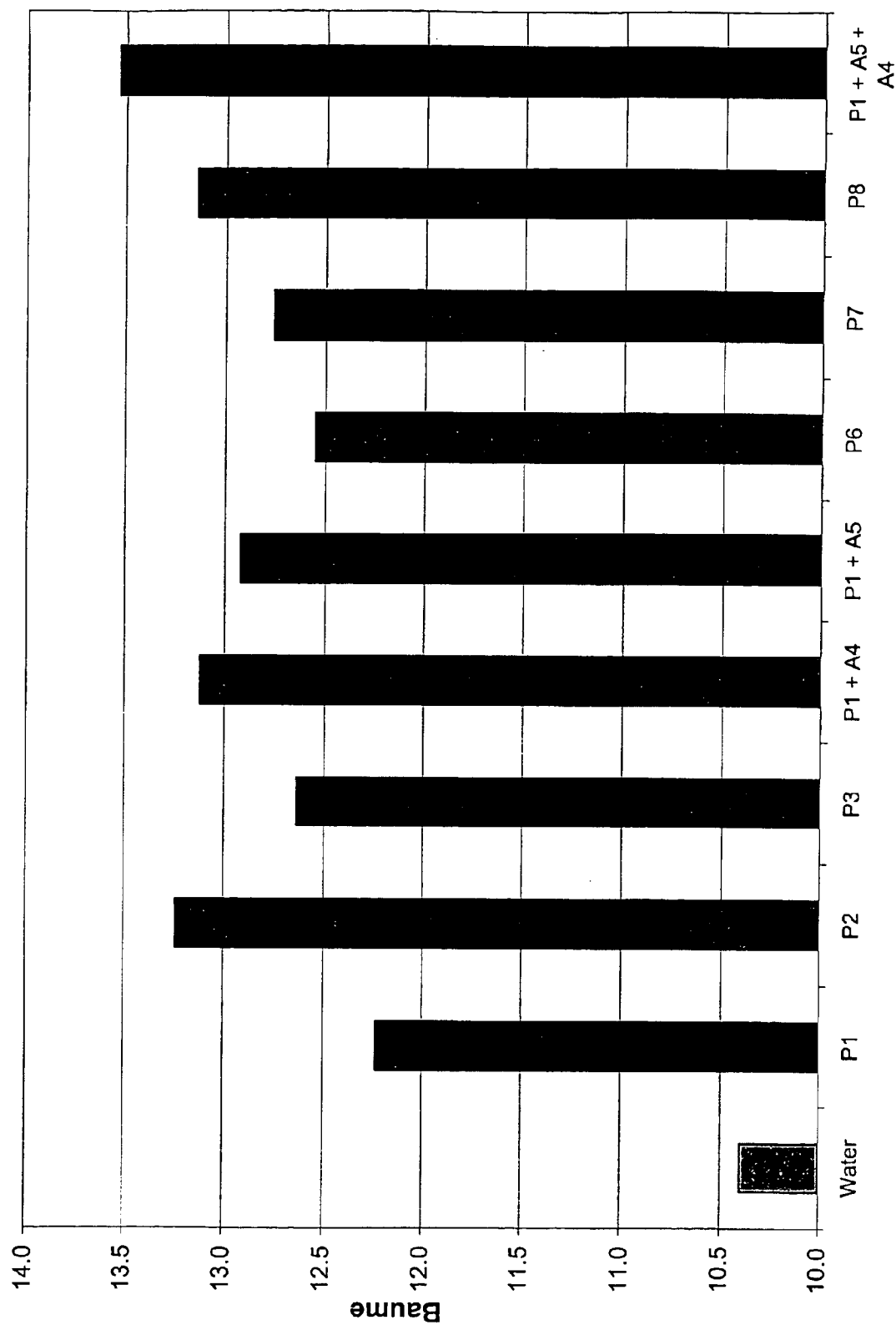
Figure 7:
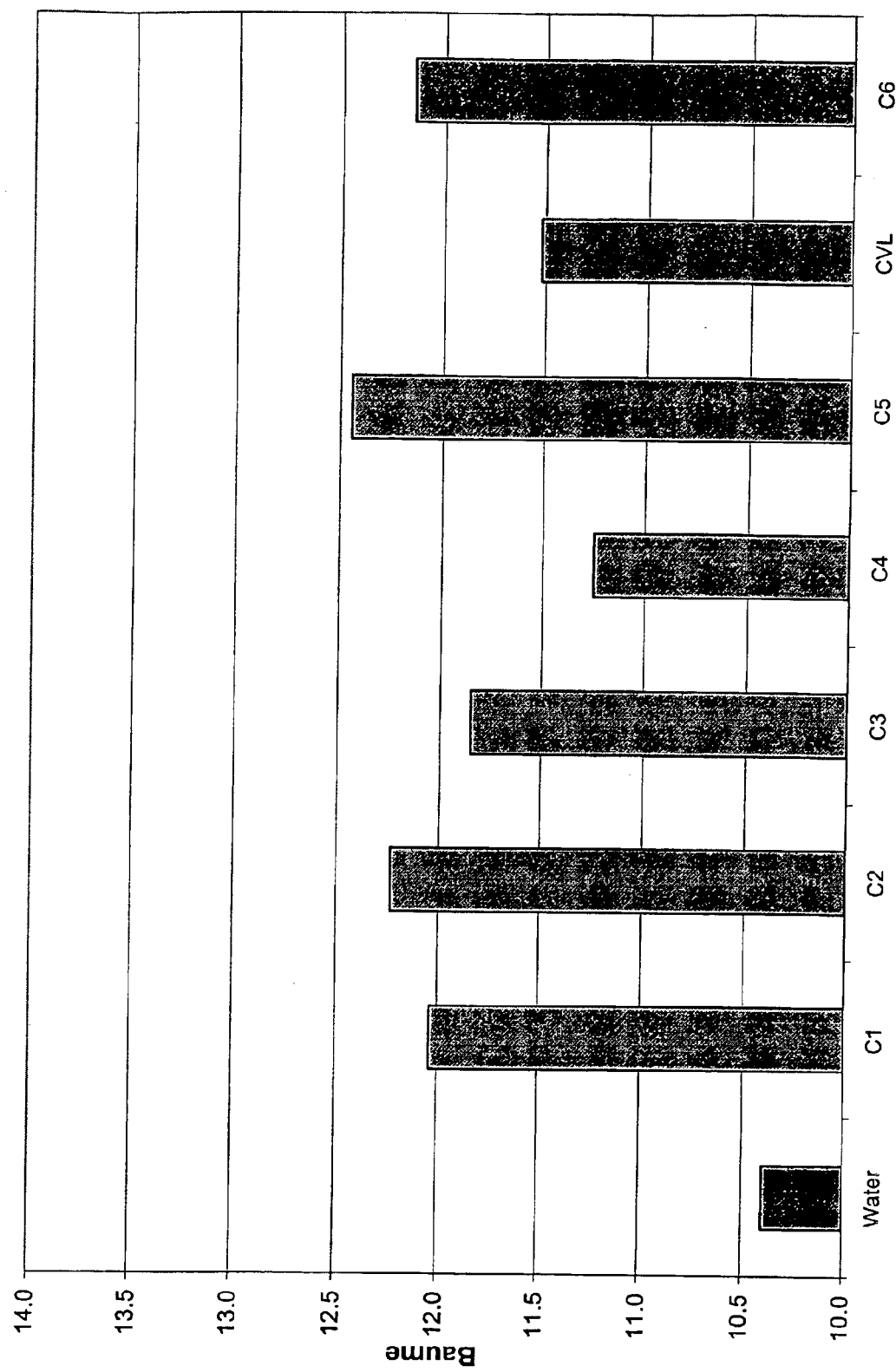

Enzyme Suppliers: Most of the enzymes were a gift from Genencor International, Inc., Rochester, N.Y.; Viscozyme L was purchased from Sigma-Aldrich Corporation and is a product of Novozymes North America, Inc., Franklinton, N.C. The enzymes in FIGS. 5–7 are as follows (names used in the following table are the names supplied by the manufacturers):

| Figure Label | Enzyme(s) Used |
| --- | --- |
| Water | Water Control |
| Slurry | Original Slurry |
| P1 | GC 106 |
| A1 | Optimalt BBA |
| C1 | GC 440 |
| C2 | GC 880 |
| C3 | Multifect GC |
| C4 | Multifect Xylanase |
| A2 | Optidex L-400 |
| A3 | G-zyme 998 |
| P2 | GC 710 |
| C5 | GC 220 |
| P3 | Multifect P3000 |
| A4 | Clarase L |
| A5 | Spezyme Fred |
| P1 + A4 | GC 106 + Spezyme Fred |
| P1 + A5 | GC 106 + Clarase L |
| A5 + A4 | Spezyme Fred + Clarase |
| CVL | Viscozyme L |
| C6 | Multifect B |
| P6 | Protex 6L |
| P7 | Purafect 4000L |
| P8 | Genencor Protease 899 |
| A3 + A5 | G-zyme 998 + Spezyme Fred |
| A6 | G-zyme 990 |
| A6 + A5 | G-zyme 990 + Spezyme Fred |
| A3 + A2 | G-zyme 998 + Optidex L-400 |
| A5 + A2 | Spezyme Fred + Optidex L-400 |
| A4 + A2 | Clarase L + Optidex L-400 |
| A5 + A2 + A4 | Spezyme Fred + Optidex L-400 + Clarase L |

-continued

| Figure Label | Enzyme(s) Used |
| --- | --- |
| A5 + A2 + A3 | Spezyme Fred + Optidex L-400 + G-zyme 998 |
| P1 + A5 + A4 | GC 106 + Spezyme Fred + Clarase L |

Results:

Amylases (FIG. 5): The use of individual amylase preparations showed moderate increases in Bé measurements over the water controls. The largest increase by a single preparation was 1.6 Bé units. The largest increase from a single amylase preparation was approximately 1.5 Bé units greater than the control. The smallest increase was 0.8 Bé units greater than the control value. Mixtures of amylases were much more likely to create a large change in Bé. The application of an alpha-amylase with significant activity at pH 5 in combination with a gluco-amylase also having good activity at this pH resulted in significant Bé increases. The increases generated using these combinations surprisingly resulted in a greater increase in Bé than the additive effects of the individual preparations. The application of an amylase in combination with a protease also resulted in significant increases in Bé, though the final values were essentially additive of the increases generated by the individual enzyme preparations.

Proteases (FIG. 6): The use of individual protease preparations resulted in good increases in the measured Bé values. These were generally much greater than the individual amylase preparations. Mixtures of protease with amylases were generally additive as previously discussed. Mixtures of different protease preparations were not investigated.

Hemicellulases/Cellulases (FIG. 7): The use of cell wall degrading enzymes was not as effective as the amylases and protease preparations; however, they still produced a significant increase in the measured Bé values and thus they can be used by themselves or in combination with amylases and/or proteases. The magnitude was not as great but the increase was still sufficient to alter the Bé sufficiently to aid in the recovery of co-products.

Discussion: The use of enzymes to alter the specific gravity of the processing solutions by hydrolyzing endogenous substrates (i.e., substrates present in the material being processed) is an excellent method to accomplish what is a necessary step for separating corn components in the present invention. The advantages of using an enzyme rather than large amounts of a salt, sugar, or recycled process water is that only a catalytic amount of material is needed, and the problems associated with recycled process water (e.g., microbial contamination and the buildup of soluble components) are minimized.

In the examples conducted in Experiment 3, the use of starch hydrolyzing enzymes (amylases) demonstrated significant increases in Bé over the control values. These changes were the result of hydrolysis of the native starch granules. Generally, commercial application of amylases in conventional production of corn syrups or ethanol (conventional dry grind process) is typically preceded by a heat treatment step that is sufficient to gelatinize the starch granules making them much more susceptible to hydrolysis. In our examples, a gelatinization step was not conducted because gelatinization would also cause an increase in viscosity making the subsequent physical separations of corn germ and corn coarse fiber difficult or impossible under these conditions. Hydrolysis of native starch granules is somewhat more difficult than hydrolysis of gelatinized starch, and the rates are typically very slow; however, the use of multiple enzymes (already present in many commercial enzyme preparations) can significantly increase the hydrolysis rate generating the needed Bé changes (as demonstrated in the examples). The deliberate mixing of enzymes with differing specificities can also promote increased hydrolysis rates. Other amylase preparations could also be used and would likely have very similar effects of increasing Bé.

The application of proteases, like the application of amylases, hydrolyzed an endogenous substrate sufficiently to alter the Bé of the suspension. In the case of protein hydrolysis, a heat treatment step is typically not required, but could be applied and, depending on the system, may increase the hydrolysis rates. However, as noted above, using a heat treatment could cause gelatinization of the starch in the slurry and increase the viscosity preventing component separation. In corn, the concentration of protein in the kernel is 8–12% on a dry weight basis. This is significantly lower than the starch content of the kernel which is 60–75%. The protein content is sufficient, however, if hydrolyzed by proteases to cause a significant change in Bé adequate to enhance floatation of other components. The examples demonstrate this using a number of different protease preparations. Other proteases could be used and would likely have very similar effects of increasing Bé. Alternately, mixtures of different proteases could also be employed to accomplish the necessary increase.

The application of cell wall degrading enzymes also hydrolyzed endogenous substrates as was demonstrated with the amylases and proteases. The enzymes tested were preparations that contained varying levels of xylanase, cellulase and other enzymes related to the degradation of cell wall components. In the examples, the Bé changes resulting from treatment with these preparations were not as significant as with the protease or the amylase preparations. The hydrolysis of cell wall components is typically more resistant to enzyme attack and the hydrolysis rates are significantly lower. Despite these difficulties, the changes in Bé in the examples were still sufficient to create the necessary increases to perform separations by floatation.

Overall, the increased Bé values demonstrated by the amylase, proteases, and the cell wall degrading enzyme preparations were more than sufficient to allow floatation of germ and/or pericarp fiber from the corn kernels. Optimal values can be adjusted by regulating the amount, the type or types of enzyme added and the overall time for enzyme incubation. Additional factors such as temperature, pH and mixing can also be adjusted to obtain the optimal Bé conditions for accomplishing the desired separations.

All of the references cited herein are incorporated by reference in their entirety. Also incorporated by reference in their entirety are the following references: U.S. Pat. No. 6,254,914; U.S. Pat. No. 6,566,125; U.S. Pat. No. 5,843,499; Approved Methods of the AACC, 8th ed., Method 44-15A, 2000, The American Association of Cereal Chemists, St Paul, Minn.; Approved Methods of the AACC, 8th ed., Method 44-18, 2000, The American Association of Cereal Chemists, St Paul, Minn.; Doner, L. W., and Hicks, K. B., Cereal Chem., 74: 176–181 (1997); Doner, L. W., et al., Cereal Chem., 75: 408–411 (1998); Eckhoff, S. R., et al., Cereal Chem., 70: 723–727 (1993); Hicks, K. B., and Moreau, R. A., Food Tech., 55: 63–67 (2001); Johnston, D. B., and Singh, V., Cereal Chem., 78: 405–411 (2001); MacDonald, T., et al., 2003, Ethanol supply outlook for California. California Energy Commission Report. 600-03-017F; Moreau, R. A., et al., Cereal Chem., 76: 449–451 (1999); Singh, V., and Eckhoff, S. R., Cereal Chem., 74: 462–466 (1997); The CORR procedure, pages 433–506 in SAS User's Guide: Statistics, 1990, The Statistical and Analysis System Institute, Inc., Cary, N.C.; Singh, V., and Eckhoff, S. R., Cereal Chem., 73; 716–720 (1996); Singh, V., et al., Cereal Chem., 76: 868–872 (1999); Singh, V., et al., Cereal Chem., 76: 846–849 (1999); Singh, V., et al., Cereal Chem., 77: 560–561 (2000); Taylor, F., et al., Appl. Biochem. and Biotech., 94: 41–49 (2001); Wahjudi, J., et al., Cereal Chem., 77: 640–644 (2000); Wang, S., et al., Cereal Chem., 76: 82–86 (1999).

Thus, in view of the above, the present invention concerns (in part) the following:

I. Simultaneous recovery of germ and fiber:

A process for recovering corn germ and corn coarse fiber from corn (e.g., in a dry grind process), comprising (or consisting essentially of or consisting of) soaking corn kernels in water to produce soaked corn kernels, grinding said soaked corn kernels to produce a ground corn slurry, and incubating said ground corn slurry with at least one enzyme (amylase(s), protease(s), cell wall degrading enzyme(s), or mixtures thereof, and optionally other enzymes) to increase the specific gravity of said slurry to about 10-about 16 Baume so that the corn germ and corn coarse fiber floats to the top of said slurry, recovering said corn germ and said corn coarse fiber, and optionally producing ethanol from the slurry no longer containing said corn germ and corn coarse fiber.

The above process, wherein said specific gravity is not increased by adding starch, a salt, a sugar syrup, or mixtures thereof to said slurry.

The above process, wherein said corn kernels are soaked for between about 3-about 12 hours.

The above process, wherein said specific gravity is increased to about 11-about 16 Baume or is increased to about 11-about 15 Baume or is increased to about 12-about 14 Baume.

The above process, wherein said incubating is at a pH of between about 2.5 and about 7 or between about 3 and about 6.5 or between about 3.5 and about 6 or between about 4 and about 5.

The above process, wherein said incubating is at a temperature of between about 25° and about 70° C. or between about 30° and about 65° C. or between about 35° and about 60° C. or between about 40° and about 55° C. or between about 45° and about 50° C.

The above process, wherein said incubating lasts between about 10 minutes and about 4 hours or between about 30 minutes and about 3 hours or between about 1 hour and 2.5 hours or about 2 hours.

The above process, wherein the concentration of said enzyme is between about 1 mg and about 1000 mg per 100 g of corn or between about 1 mg and about 100 mg per 100 g of corn or between about 1 mg and about 50 mg per 100 g of corn or between about 1 mg and about 10 mg per 100 g of corn.

The above process, wherein said enzyme is at least one amylase.

The above process, wherein said enzyme is at least one protease.

The above process, wherein said enzyme is at least one cell wall degrading enzyme.

The above process, wherein said enzyme is at least one amylase and at least one protease.

The above process, wherein said enzyme is at least one amylase and at least one cell wall degrading enzyme.

The above process, wherein said enzyme is at least one protease and at least one cell wall degrading enzyme.

The above process, wherein said enzyme is at least one amylase, at least one protease, and at least one cell wall degrading enzyme.

The above process, wherein said process up to and including said incubating is conducted at a temperature below the temperature at which corn starch gelatinizes.

The above process, wherein said incubating is at a temperature below the temperature at which corn starch gelatinizes.

The above process, wherein said soaking and said grinding is at a temperature below the temperature at which corn starch gelatinizes.

The above process, wherein the starch in said corn is not gelatinized prior to said recovering of said corn germ and said corn coarse fiber.

The above process, wherein the starch in said corn is gelatinized only after said recovering of said corn germ and said corn coarse fiber.

The above process, wherein said process further comprises producing ethanol from the slurry no longer containing said corn germ and corn coarse fiber.

A process for recovering corn germ and corn coarse fiber from corn (e.g., in a dry grind process), said process comprising (or consisting essentially of or consisting of) soaking corn in water to loosen the attachments of various grain components therein to each other, degerminating the soaked corn to strip the corn coarse fiber and germ away from the endosperm, recovering the corn germ and corn coarse fiber by increasing the specific gravity of a slurry including the germ and corn coarse fiber therein to about 10-about 16 Baume by addition of at least one enzyme (amylase(s), protease(s), cell wall degrading enzyme(s), or mixtures thereof, and optionally other enzymes) so that the corn germ and corn coarse fiber floats to the top of said slurry for removal of said corn germ and corn coarse fiber, and optionally producing ethanol from the slurry no longer containing said corn germ and corn coarse fiber.

II. Sequential recovery of germ and fiber:

A process for recovering corn germ and corn coarse fiber from corn (e.g., in a dry grind process), comprising (or consisting essentially of or consisting of) soaking corn kernels in water to produce soaked corn kernels, grinding said soaked corn kernels to produce a ground corn slurry, incubating said ground corn slurry with at least one enzyme (anylase(s), protease(s), cell wall degrading enzyme(s), or mixtures thereof, and optionally other enzymes) to increase the specific gravity of said slurry to about 7-about 11 Baume so that the corn germ floats to the top of said slurry, recovering said corn germ, incubating said ground corn slurry no longer containing said corn germ with at least one enzyme (amylase(s), protease(s), cell wall degrading enzyme(s), or mixtures thereof, and optionally other enzymes) to increase the specific gravity of said slurry to about 11-about 16 Baume so that the corn coarse fiber floats to the top of said slurry, recovering said corn coarse fiber, and optionally producing ethanol from the slurry no longer containing said corn germ and corn coarse fiber.

The above process, wherein the specific gravity is not increased by adding starch, a salt, a sugar syrup, or mixtures thereof to said slurry.

A process for recovering corn germ and corn coarse fiber from corn (e.g., in a dry grind process), said process comprising (or consisting essentially of or consisting of) soaking corn in water to loosen the attachments of various grain components therein to each other, degerminating the soaked corn to strip the corn coarse fiber and germ away from the endosperm, recovering the corn germ by increasing the specific gravity of a slurry including the germ and corn coarse fiber therein to about 7-about 11 Baume by addition of at least one enzyme (amylase(s), protease(s), cell wall degrading enzyme(s), or mixtures thereof, and optionally other enzymes) so that the corn germ floats to the top of said slurry for removal of said corn germ, recovering the corn coarse fiber by increasing the specific gravity of a slurry including the corn coarse fiber therein to about 11-about 16 Baume by addition of at least one enzyme (amylases(s), protease(s), cell wall degrading enzyme(s), or mixtures thereof, and optionally other enzymes) so that the corn coarse fiber floats to the top of said slurry for removal of said corn coarse fiber, and optionally producing ethanol from the slurry no longer containing said corn germ and corn coarse fiber.

III. Recovery of germ:

A process for recovering corn germ from corn (e.g., in a dry grind process), comprising (or consisting essentially of or consisting of) soaking corn kernels in water to produce soaked corn kernels, grinding said soaked corn kernels to produce a ground corn slurry, and incubating said ground corn slurry with at least one enzyme (amylase(s), protease(s), cell wall degrading enzyme(s), or mixtures thereof, and optionally other enzymes) to increase the specific gravity of said slurry to about 7-about 11 Baume so that the corn germ floats to the top of said slurry, recovering said corn germ, and optionally producing ethanol from the slurry no longer containing said corn germ.

The above process, wherein the specific gravity is not increased by adding starch, a salt, a sugar syrup, or mixtures thereof to said slurry.

A process for recovering corn germ from corn (e.g., in a dry grind process), said process comprising (or consisting essentially of or consisting of) soaking corn in water to loosen the attachments of various grain components therein to each other, degerminating the soaked corn to strip the corn coarse fiber and germ away from the endosperm, recovering the corn germ by increasing the specific gravity of a slurry including the germ and corn coarse fiber therein to about 7-about 11 Baume by addition of at least one enzyme (amylase(s), protease(s), cell wall degrading enzyme(s), or mixtures thereof, and optionally other enzymes) so that the corn germ floats to the top of said slurry for removal of said corn germ, and optionally producing ethanol from the slurry no longer containing said corn germ.

A corn product removal process comprising (or consisting essentially of or consisting of) soaking corn in water to loosen the attachments of various grain components therein to each other; degerminating the soaked corn to strip the corn coarse fiber and germ away from the endosperm; recovering the germ by increasing the specific gravity of a slurry including the germ and corn coarse fiber therein to approximately within the range of 7 to 11 Baume for removal of the germ; recovering the corn coarse fiber by increasing the specific gravity of a slurry including the corn coarse fiber therein to approximately within the range of 11–16 Baume so that the corn coarse fiber floats to the top of said slurry for removal of said corn coarse fiber; fermenting remaining slurry; and distilling fermented liquid to produce ethanol.

The above process, wherein the specific gravity is not increased by adding starch, a salt, a sugar syrup, or mixtures thereof to said slurry.

A corn product removal process comprising (or consisting essentially of or consisting of) soaking corn in water to loosen the attachments of various grain components therein to each other; degerminating the soaked corn to strip the corn coarse fiber and germ away from the endosperm; recovering the germ and corn coarse fiber by increasing the specific gravity of a slurry including the corn coarse fiber therein to approximately within the range of 11–16 Baume so that the germ and corn coarse fiber floats to the top of said slurry for removal of said germ and corn coarse fiber; fermenting remaining slurry; and distilling fermented liquid to produce ethanol.

The above process, wherein the specific gravity is not increased by adding starch, a salt, a sugar syrup, or mixtures thereof to said slurry.

A process for recovering corn coarse fiber during a dry-grind ethanol production process, said recovery process comprising (or consisting essentially of or consisting of) soaking corn in chemical-free water to loosen the attachments of various grain components therein to each other, degerminating the soaked corn to strip the corn coarse fiber and germ away from the endosperm; and recovering the corn coarse fiber by increasing the specific gravity of a slurry including the corn coarse fiber therein to approximately within the range of above about 11-about 16 Baume so that the corn coarse fiber with the germ floats to the top of said slurry for removal of said corn coarse fiber with the germ.

The above process, wherein the specific gravity is not increased by adding starch, a salt, a sugar syrup, or mixtures thereof to said slurry.

The above processes, wherein soaking the corn comprises soaking the corn in distilled water.

The above processes, wherein degerminating the soaked corn comprises grinding the soaked corn.

The above processes, wherein recovering the germ comprises using germ hydrocyclones.

The above processes, wherein recovering the coarse fiber comprises using coarse fiber hydrocyclones.

The above processes, wherein recovering the germ and recovering the corn coarse fiber are performed together by flotation.

The above processes, further comprising drying the combination of germ and corn coarse fiber; and separating the germ and the corn coarse fiber from each other using an aspirator.

The above processes, wherein recovering said germ is performed prior to recovering said corn coarse fiber.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

We claim:

1. A dry grind process for recovering corn germ and corn coarse fiber from corn, said dry grind process comprising soaking corn kernels in water to produce soaked corn kernels, grinding said soaked corn kernels to produce a ground corn slurry and incubating said ground corn slurry with at least one enzyme selected from the group consisting of amylases, proteases, cell wall degrading enzymes, and mixtures thereof, to increase the specific gravity of said slurry to about 10-about 16 Baume so that the corn germ and corn coarse fiber floats to the top of said slurry, recovering said corn germ and said corn coarse fiber, and optionally producing ethanol from the slurry no longer containing said corn germ and corn coarse fiber.

2. The process according to claim 1, wherein said specific gravity is not increased by adding starch, a salt, a sugar syrup, or mixtures thereof to said slurry.

3. The process according to claim 1, wherein said corn kernels are soaked for between about 3-about 12 hours.

4. The process according to claim 1, wherein said specific gravity is increased to about 11-about 16 Baume.

5. The process according to claim 1, wherein said specific gravity is increased to about 11-about 15 Baume.

6. The process according to claim 1, wherein said specific gravity is increased to about 12-about 14 Baume.

7. The process according to claim 1, wherein said incubating is at a pH of between about 2.5 and about 7.

8. The process according to claim 1, wherein said incubating is at a pH of between about 3 and about 6.5.

9. The process according to claim 1, wherein said incubating is at a pH of between about 3.5 and about 6.

10. The process according to claim 1, wherein said incubating is at a pH of between about 4 and about 5.

11. The process according to claim 1, wherein said incubating is at a temperature of between about 25° and about 70° C.

12. The process according to claim 1, wherein said incubating is at a temperature of between about 30° and about 65° C.

13. The process according to claim 1, wherein said incubating is at a temperature of between about 35° and about 60° C.

14. The process according to claim 1, wherein said incubating is at a temperature of between about 40° and about 55° C.

15. The process according to claim 1, wherein said incubating is at a temperature of between about 45° and about 50° C.

16. The process according to claim 1, wherein said incubating lasts between about 10 minutes and about 4 hours.

17. The process according to claim 1, wherein said incubating lasts between about 30 minutes and about 3 hours.

18. The process according to claim 1, wherein said incubating lasts between about 1 hour and 2.5 hours.

19. The process according to claim 1, wherein said incubating lasts about 2 hours.

20. The process according to claim 1, wherein the concentration of said enzyme is between about 1 mg and about 1000 mg per 100 g of corn.

21. The process according to claim 1, wherein the concentration of said enzyme is between about 1 mg and about 100 mg per 100 g of corn.

22. The process according to claim 1, wherein the concentration of said enzyme is between about 1 mg and about 50 mg per 100 g of corn.

23. The process according to claim 1, wherein the concentration of said enzyme is between about 1 mg and about 10 mg per 100 g of corn.

24. The process according to claim 1, wherein said enzyme is at least one amylase.

25. The process according to claim 1, wherein said enzyme is at least one protease.

26. The process according to claim 1, wherein said enzyme is at least one cell wall degrading enzyme.

27. The process according to claim 1, wherein said enzyme is at least one amylase and at least one protease.

28. The process according to claim 1, wherein said enzyme is at least one amylase and at least one cell wall degrading enzyme.

29. The process according to claim 1, wherein said enzyme is at least one protease and at least one cell wall degrading enzyme.

30. The process according to claim 1, wherein said enzyme is at least one amylase, at least one protease, and at least one cell wall degrading enzyme.

31. The process according to claim 1, wherein said process up to and including said incubating is conducted at a temperature below the temperature at which corn starch gelatinizes.

32. The process according to claim 1, wherein said process further comprises producing ethanol from the slurry no longer containing said corn germ and corn coarse fiber.

33. A dry grind process for recovering corn germ and corn coarse fiber from corn, said dry grind process comprising soaking corn kernels in water to produce soaked corn kernels, grinding said soaked corn kernels to produce a ground corn slurry, incubating said ground corn slurry with at least one enzyme selected from the group consisting of amylases, proteases, cell wall degrading enzymes, and mixtures thereof, to increase the specific gravity of said slurry to about 7-about 11 Baume so that the corn germ floats to the top of said slurry, recovering said corn germ, incubating said ground corn slurry no longer containing said corn germ with at least one enzyme selected from the group consisting of amylases, proteases, cell wall degrading enzymes, and mixtures thereof to increase the specific gravity of said slurry to about 11-about 16 Baume so that the corn coarse fiber floats to the top of said slurry, recovering said corn coarse fiber, and optionally producing ethanol from the slurry no longer containing said corn germ and corn coarse fiber.

34. The process according to claim 33, wherein the specific gravity is not increased by adding starch, a salt, a sugar syrup, or mixtures thereof to said slurry.

35. The process according to claim 33, wherein said process up to and including said second incubating is conducted at a temperature below the temperature at which corn starch gelatinizes.

36. A dry grind process for recovering corn germ from corn said dry grind process comprising soaking corn kernels in water to produce soaked corn kernels, grinding said soaked corn kernels to produce a ground corn slurry and incubating said ground corn slurry with at least one enzyme selected from the group consisting of amylases, proteases, cell wall degrading enzymes, and mixtures thereof to increase the specific gravity of said slurry to about 7-about 11 Baume so that the corn germ floats to the top of said slurry, recovering said corn germ, and optionally producing ethanol from the slurry no longer containing said corn germ.

37. The process according to claim 36, wherein the specific gravity is not increased by adding starch, a salt, a sugar syrup, or mixtures thereof to said slurry.

38. The process according to claim 36, wherein said process up to and including said incubating is conducted at a temperature below the temperature at which corn starch gelatinizes.

* * * * *